(12) United States Patent
Kuo

(10) Patent No.: US 8,177,073 B2
(45) Date of Patent: May 15, 2012

(54) WATER PROCESSOR

(75) Inventor: Chi-Chang Kuo, Taichung (TW)

(73) Assignee: New Century Membrane Technology Co., Ltd., Taichung (TW)

( * ) Notice: Subject to any disclaimer, the term of this patent is extended or adjusted under 35 U.S.C. 154(b) by 419 days.

(21) Appl. No.: 12/541,901

(22) Filed: Aug. 14, 2009

(65) Prior Publication Data

US 2011/0036767 A1 Feb. 17, 2011

(51) Int. Cl.
- *B01D 35/22* (2006.01)
- *B01D 29/54* (2006.01)
- *B01D 65/02* (2006.01)
- *B01D 63/08* (2006.01)

(52) U.S. Cl. ........ 210/415; 210/106; 210/107; 210/108; 210/321.63; 210/321.69; 210/323.1; 210/324; 210/330; 210/332; 210/333.01; 210/334; 210/354; 210/359; 210/369; 210/372; 210/374; 210/391; 210/393; 210/397; 210/407; 210/408; 210/409; 210/410; 210/411; 210/412; 210/413; 210/414; 210/416.1

(58) Field of Classification Search .......... 210/106–108, 210/321.63, 321.69, 321.7, 323.3, 324, 330, 210/332, 333.01, 334, 354, 359, 369, 372, 210/374, 391, 393, 397, 407, 408, 409, 410, 210/411, 412, 413, 414, 415, 416.01

See application file for complete search history.

(56) References Cited

U.S. PATENT DOCUMENTS

| | | | | |
|---|---|---|---|---|
| 4,601,824 A * | 7/1986 | Dreyer | ........................... | 210/232 |
| 6,280,626 B1 * | 8/2001 | Miyashita et al. | ............ | 210/636 |
| 6,706,518 B2 * | 3/2004 | Lorenz et al. | ................. | 435/264 |
| 7,267,236 B2 * | 9/2007 | Kuo | ............................. | 210/415 |
| 7,396,462 B2 * | 7/2008 | Kuo | ........................ | 210/321.63 |
| 7,938,966 B2 * | 5/2011 | Johnson | ........................ | 210/636 |
| 8,048,306 B2 * | 11/2011 | Zha et al. | ...................... | 210/636 |
| 2006/0000774 A1 * | 1/2006 | Johnson | ........................ | 210/636 |
| 2009/0050555 A1 * | 2/2009 | Baba et al. | ............... | 210/321.69 |

* cited by examiner

*Primary Examiner* — John Kim

(57) ABSTRACT

A quickly cleanable water processor includes a shell, a water pipe, at least one filtering unit and a cleaning unit. The shell includes a space defined therein, a water inlet, a water outlet and an air inlet. The water inlet and outlet and the air inlet and outlet are in communication with the space. The water pipe is disposed in the shell and made with slots in communication with the water inlet. The filtering unit is detachably provided around the water pipe. The filtering unit includes alternately arranged membrane bags and water-guiding discs. The cleaning unit includes an air pump and an air pipe extended into the shell from the air pump through the air inlet. The air pipe includes apertures through which air reaches the membrane bags from the air pipe.

6 Claims, 7 Drawing Sheets

WATER PROCESSOR

BACKGROUND OF INVENTION

1. Field of Invention

The present invention relates to a water processor and, more particularly, to a water processor with filtering membrane bags which can be cleaned quickly and economically.

2. Related Prior Art

It is common to use membranes to separate solids from liquid. The membranes could easily be blocked with mud or sludge. Hence, it is an important issue to reduce such blocking.

As disclosed in U.S. Pat. No. 7,267,236, a water processor includes a waterproof container, a central water pipe disposed in the container and a filtering unit provided around the water pipe. The filtering unit includes alternately arranged membranes and rotational discs. Each of the rotational discs includes a bladed wheel for contact with a related one of the membranes. Moreover, four peripheral water pipes are arranged around the filtering unit. Each of the peripheral water pipes includes a slot for generating water jet for propelling the bladed wheels to clean the membranes.

There are however problems with this conventional water processor. Firstly, dirty water must be released from the container or the water jet cannot effectively propel the bladed wheels to clean the membranes. However, once all of the dirty is gone, the membranes flex so that the bladed wheels cannot properly contact and clean the membranes.

Secondly, central portions of the membranes are sheltered with the rotational discs and cannot be cleaned with the bladed wheels. Thus, particles and impurities stick to the membranes, and that will eventually interfere with the removal of the membranes.

Thirdly, the cleaning is not economic because all of the dirty water must be released from the container before the cleaning is conducted with the water jet, and the water jet consumes a lot of clean water.

Therefore, the present invention is intended to obviate or at least alleviate the problems encountered in prior art.

SUMMARY OF INVENTION

It is the primary objective of the present invention to provide a water processor which can be cleaned quickly and economically.

To achieve the foregoing objective, the water processor includes a shell, a water pipe, at least one filtering unit and a cleaning unit. The shell includes a space defined therein, a water inlet, a water outlet and an air inlet. The water inlet and outlet and the air inlet and outlet are in communication with the space. The water pipe is disposed in the shell and made with slots in communication with the water inlet. The filtering unit is detachably provided around the water pipe. The filtering unit includes alternately arranged membrane bags and water-guiding discs. The cleaning unit includes an air pump and an air pipe extended into the shell from the air pump through the air inlet. The air pipe includes apertures through which air reaches the membrane bags from the air pipe.

Other objectives, advantages and features of the present invention will become apparent from the following description referring to the attached drawings.

BRIEF DESCRIPTION OF DRAWINGS

The present invention will be described via detailed illustration of three embodiments referring to the drawings.

DETAILED DESCRIPTION OF EMBODIMENTS

Figure 1:
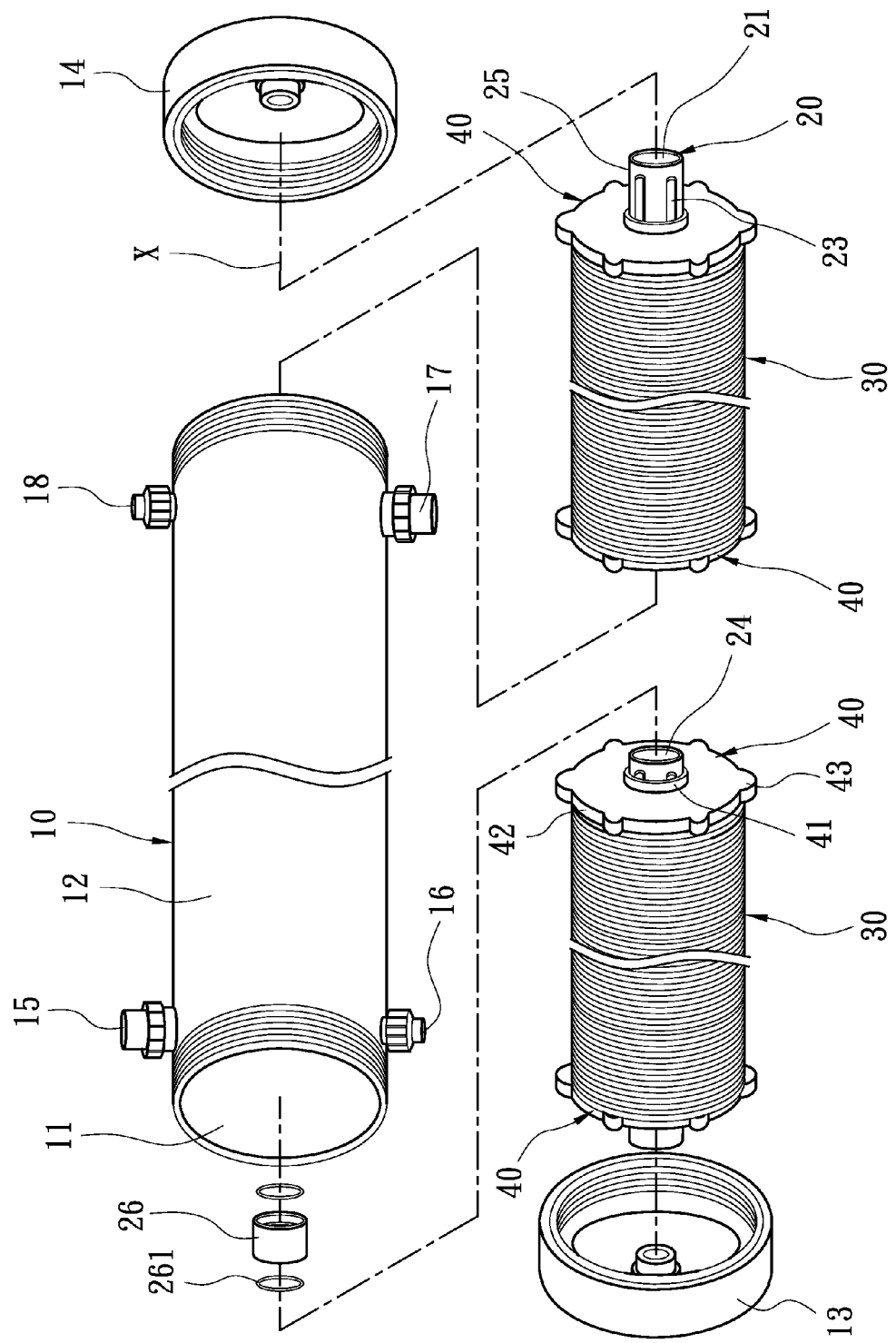
FIG. 1 is an exploded view of a water processor according to the first embodiment of the present invention.
Figure 2:
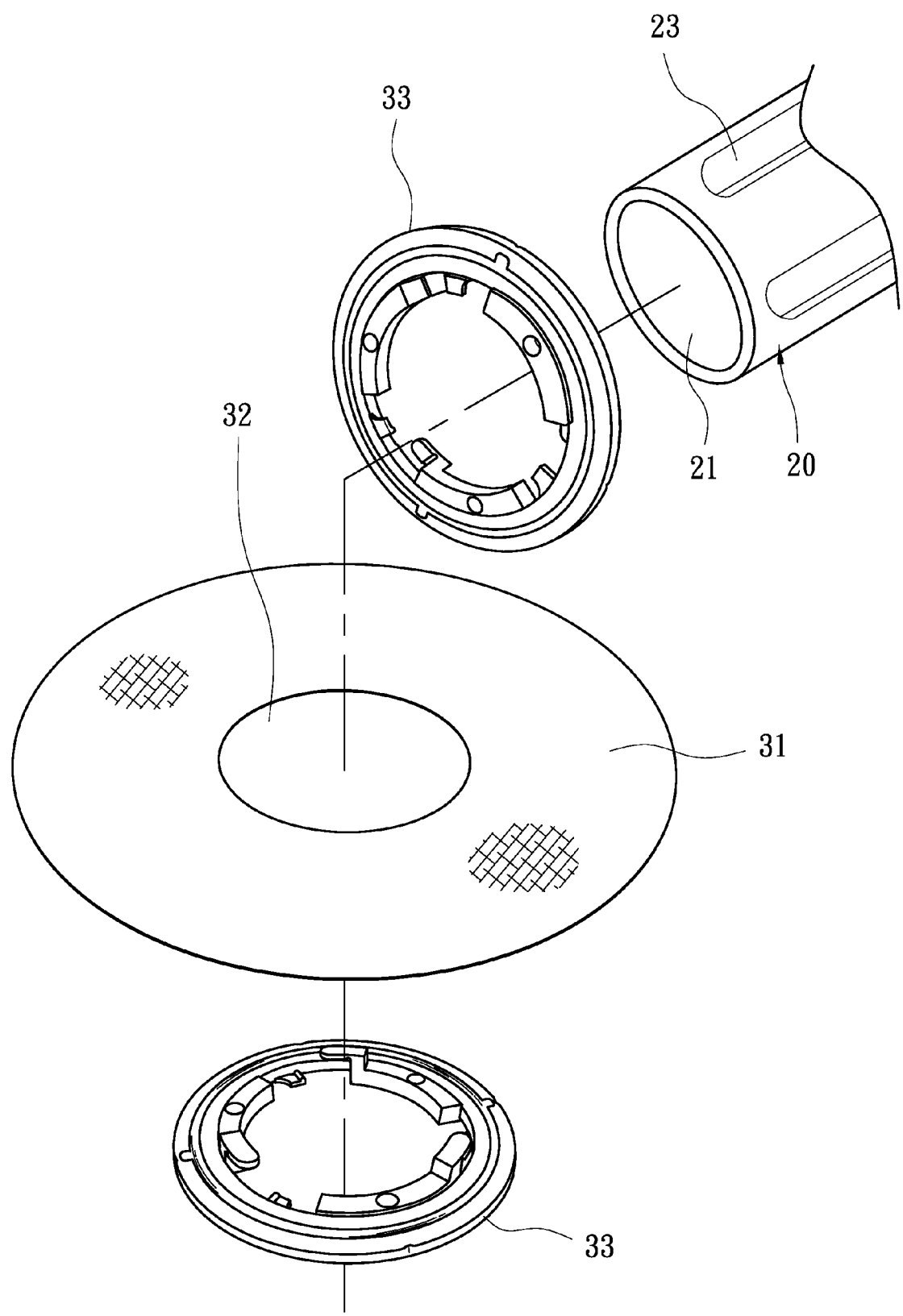
FIG. 2 is a partial view of the water processor shown in FIG. 1.
Figure 3:
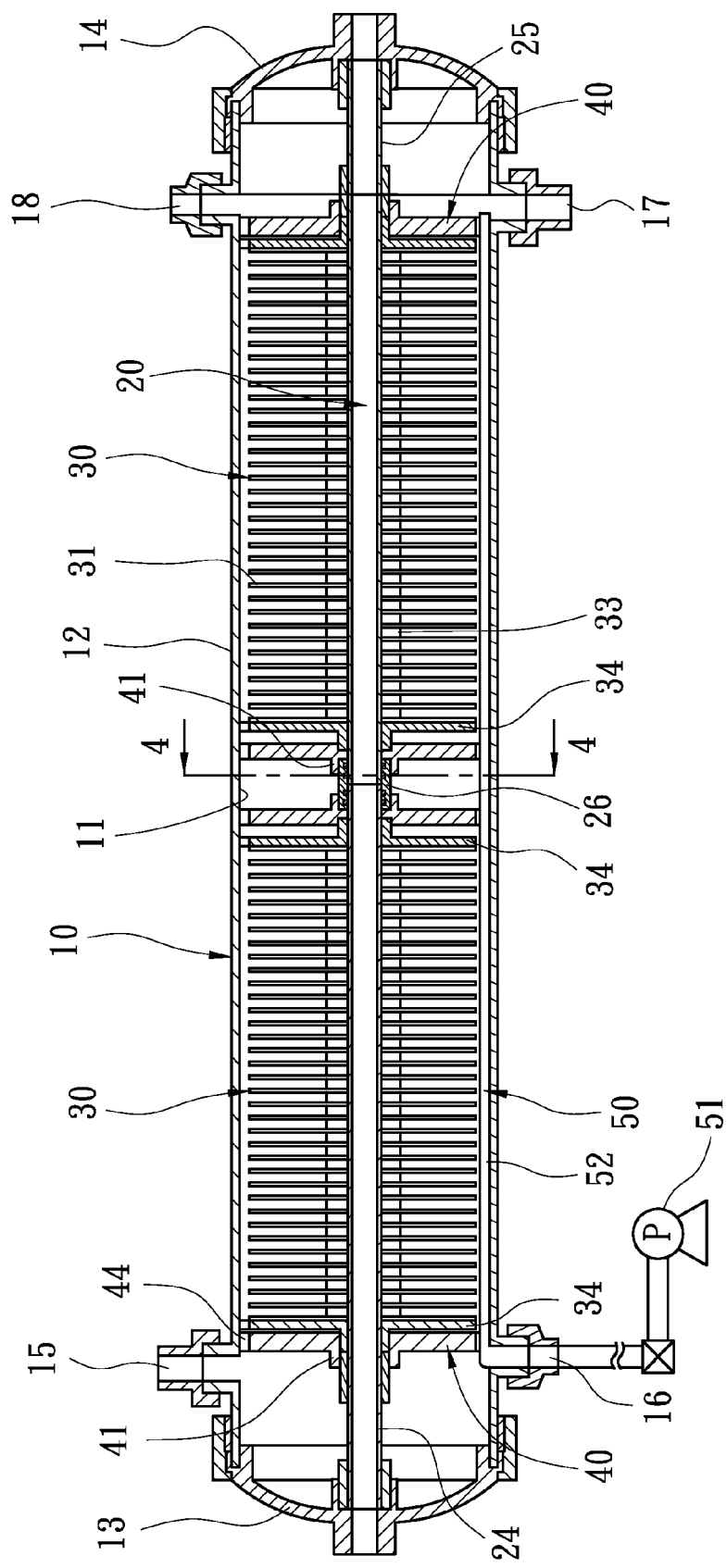
FIG. 3 is a cross-sectional view of the water processor of FIG. 1.

Referring to FIGS. 1 through 5, a water processor includes a shell 10, a water pipe 20, at least one filtering unit 30, positioning discs 40 and a cleaning unit 50 according to a first embodiment of the present invention. The shell 10 includes a cylinder 12 and two covers 13 and 14 for closing two open ends of the cylinder 12. The cylinder 12 includes a space 11 defined therein, a water inlet 15 near the cover 13, an air inlet 16 near the cover 13, a water outlet 17 near the cover 14 and an air outlet 18 near the cover 14. All of the water inlet 15, the water outlet 17, the air inlet 16 and the air outlet 18 are in communication with the space 11.

The water pipe 20 is disposed in the shell 10. The water pipe 20 includes two sections 24 and 25 that are made separately and then connected to each other with a tubular joint 26. An annular seal 261 is provided the tubular joint 26 and each of the sections 24 and 25 of the water pipe 20. Each of the sections 24 and 25 of the water pipe 20 includes a tunnel 21 defined therein and slots 23 in communication with the tunnel 21.

A filtering unit 30 is detachably provided around each of the sections 24 and 25 of the water pipe 20. Each of the filtering units 30 includes membrane bags 31, water-guiding discs 33 and two pressing discs 34. The membrane bags 31 and the water-guiding discs 33 are alternately arranged, and located between the pressing discs 34. Each of the membrane bags 31 includes a central aperture 32 through which the water pipe 20 is inserted. The membrane bags 31 extend perpendicular to the water pipe 20. More details of the membrane bags 31 and the water-guiding discs 33 are given in U.S. Pat. No. 7,396,462.

Each of the filtering units 30 is provided between two related ones of the positioning discs 40. Each of the positioning discs 40 includes a ring 41 formed at a center thereof and bosses 43 arranged along an edge 42 thereof. The bosses 43 are abutted against the cylinder 12 when the positioning discs 40 are disposed in the shell 10. A recess 44 is defined between any two adjacent ones of the bosses 43. The tubular joint 26 includes a portion inserted in the ring 41 a positioning disc 40 and another portion inserted in the ring 41 of another positioning disc 40.

The cleaning unit 50 includes an air pump 51 and an air pipe 52 extended into the shell 10 from the air pump 51 through the air inlet 16. The air pipe 52 includes apertures 53 for providing air jet to the membrane bags 31. The external diameter of the air pipe 52 is smaller than the depth of the recesses 44 so that the positioning discs 40 and the filtering units 30 can be inserted into the cylinder 12 after the air pipe 52 is inserted in the cylinder 12.

To clean the filtering units 30 after the water processor is used for some time, the water inlet 15 is closed and clean water is provided into the shell 10 through the water outlet 17. The clean water expands the membrane bags 31 and washes impurities from the membrane bags 31. Then, a small portion, 5% to 10%, of the water is released from the shell 10 through the water outlet 17, thus reducing the hydraulic pressure in the shell 10. The reduced hydraulic pressure allows the membrane bags 31 not to expand; however, there is a proper gap between any two adjacent one of the membrane bags 31. Then, the water outlet 17 is closed, and the air pump 51 is actuated to pump air into the air pipe 52 so that the air goes into the shell 10 from the air pipe 52 through the apertures 53 in the form of air jet. The air jet rushes the impurity from the membrane bags 31. The water jet hits the membrane bags 31 and an internal side of the shell 10, thus producing a lot of bubbles and currencies that facilitate the removal of the impurities. After a period of time, the air pump 51 is stopped. Finally, the water outlet 17 is opened to release all of the water from the shell 10.

Figure 7:
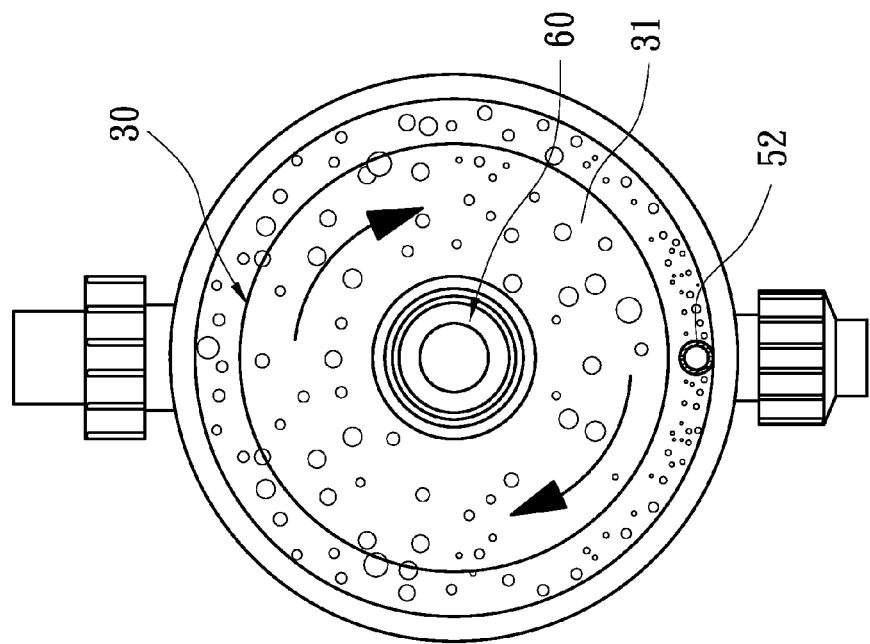
FIG. 7 is a cross-sectional view of the water processor of FIG. 6.
Figure 4:
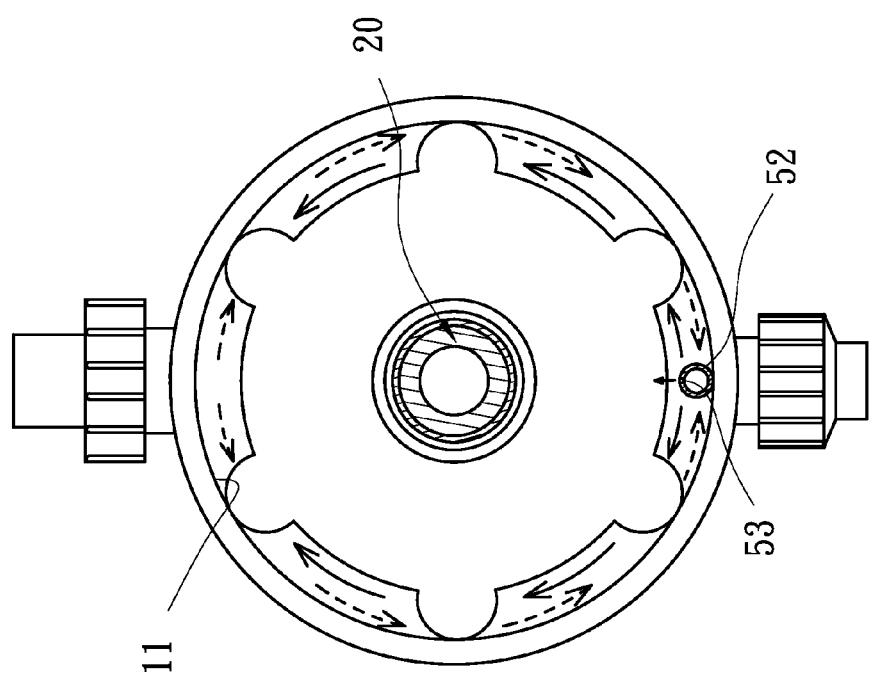
FIG. 4 is a cross-sectional view of the water processor of FIG. 3.
Figure 5:
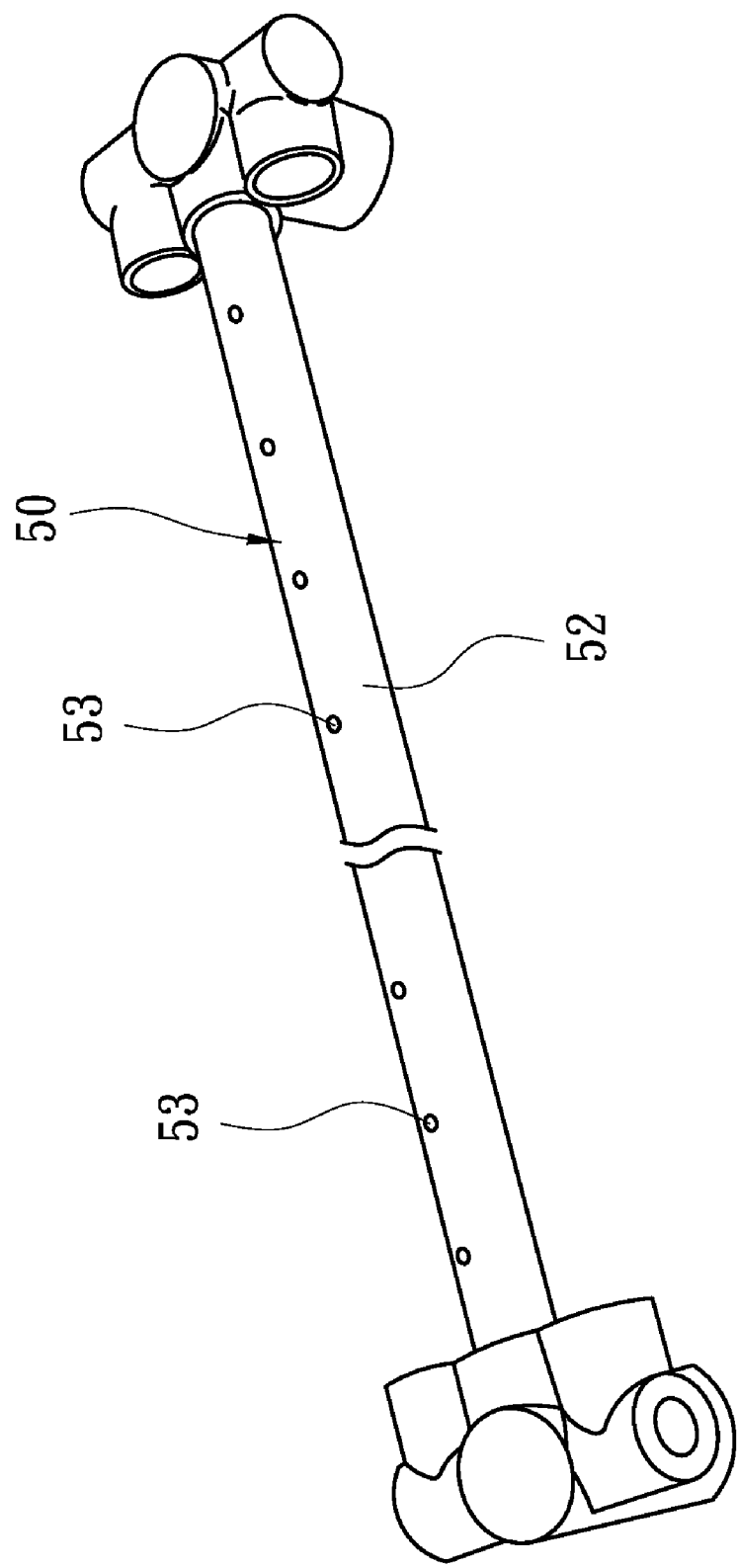
FIG. 5 is a partial, perspective view of a cleaning device of the water processor of FIG. 1.
Figure 6:
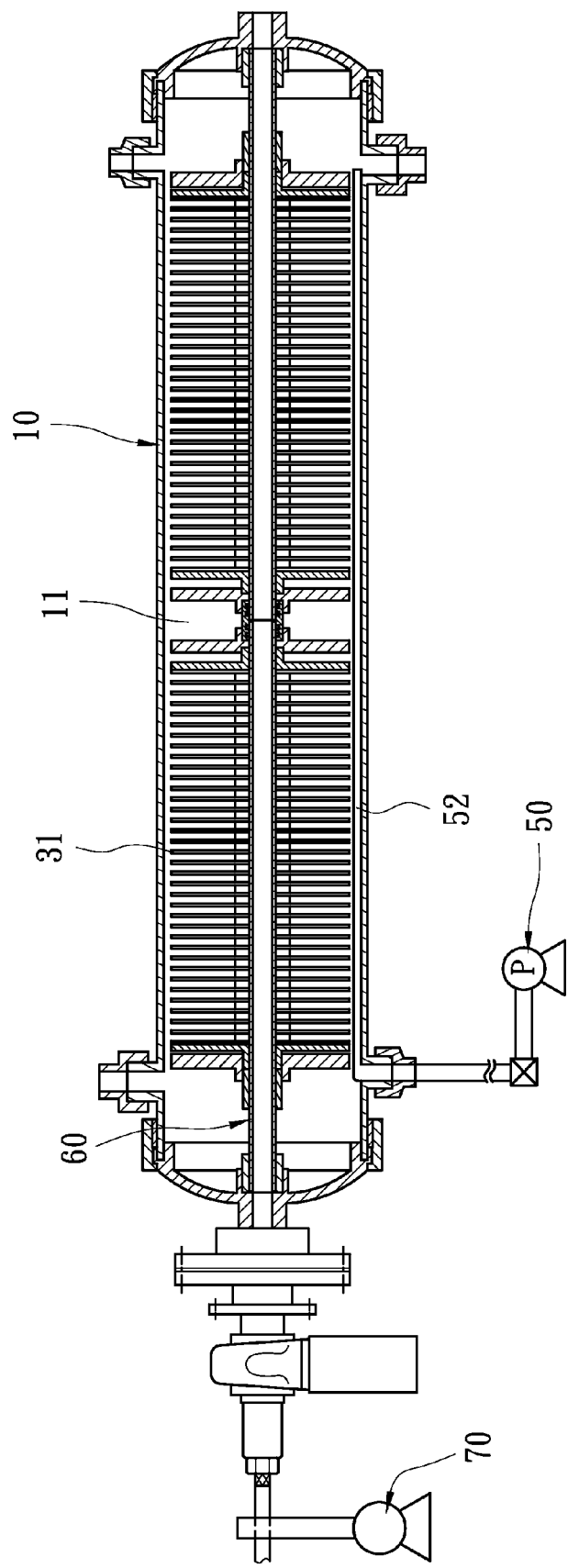
FIG. 6 is a cross-sectional view of a water processor according to the second embodiment of the present invention.

Referring to FIGS. 6 and 7, a water processor according to a second embodiment of the present invention is shown. The second embodiment is like the first embodiment except a few things. Firstly, a water pipe 60 is used instead of the water pipe 20. The water pipe 60 is rotationally disposed in the shell 10 with two bearings on the covers 13 and 14. The water pipe 60 includes an end extended from the shell 10 and operatively connected to a motor 70 via a reduction mechanism. The motor 70 can drive the water pipe 60 as well as the filtering units 30. The rotation of the filtering units 30 is helpful for the cleaning of the membrane bags 31. Secondly, the bosses 43 are omitted for not being needed to support the water pipe 20 as well as the filtering units 30.

The water processor according to the second embodiment of the present invention can be used in a membrane bioreactor to prevent an excessively thick biologic membrane that would otherwise block. The water processor can adjust the proportion between an aerobic zone and an anaerobic zone to avoid concentration polarization in dirty water.

Figure 8:
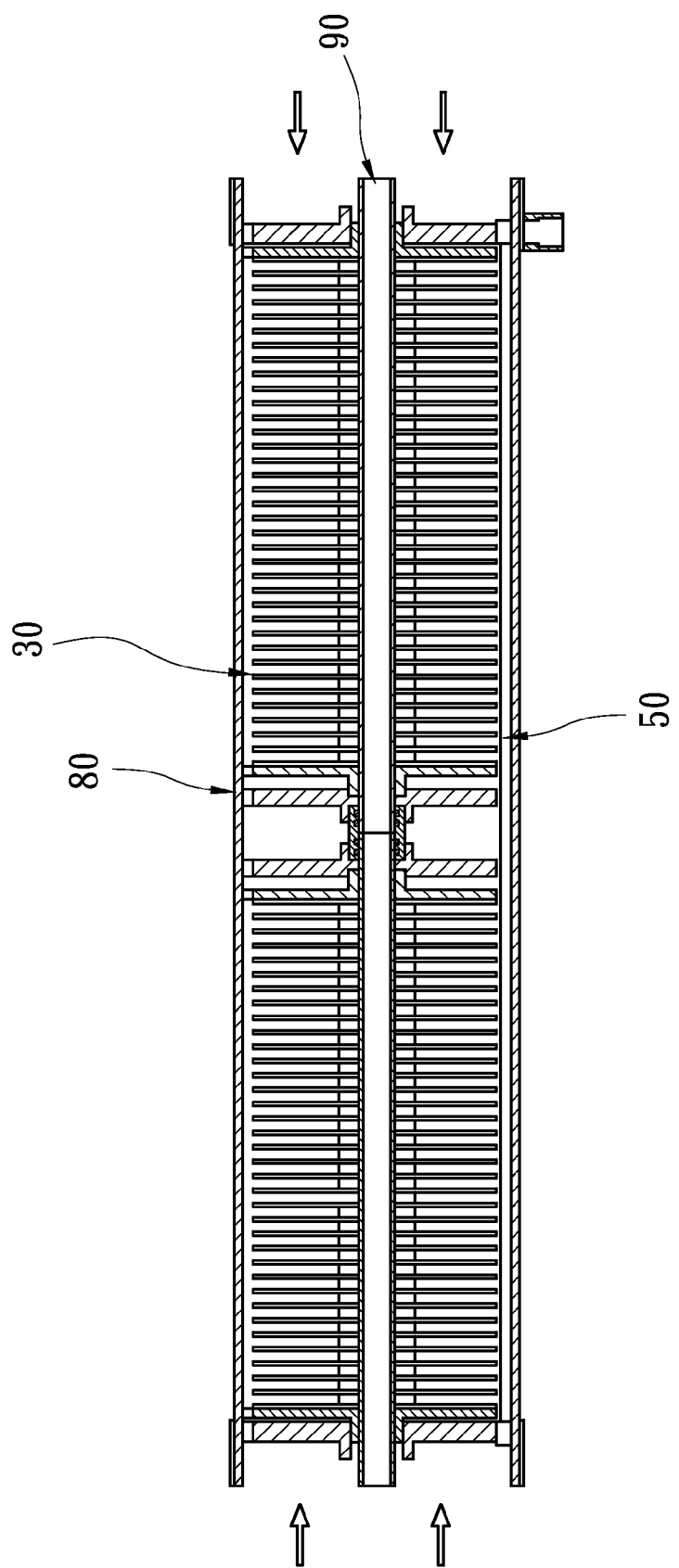
FIG. 8 is a cross-sectional view of a water processor according to the third embodiment of the present invention.

Referring to FIG. 8, there is shown a water processor according to a third embodiment of the present invention. The third embodiment is like the first embodiment except a few things. Firstly, a shell 80 is used instead of the shell 10. The shell 80 includes two open ends. Secondly, a water pipe 90 is used instead of the water pipe 20. The shell 80, the water pipe 90 and the filtering units 30 are submerged in dirty water. Vacuum is generated to suck the dirty water into the water pipe 90 from the shell 80.

The water processor of the present invention exhibits at least three advantages. Firstly, it is economic for consuming only a little water. This is partly because only a little water is released from the shell 10 before the cleaning of the membrane bags 31. Moreover, there is no need for a continuous supply of water to clean the membrane bags 31 since the air is used to stir the water to clean the membrane bags 31.

Secondly, it is economic for consuming only a little energy since it requires only a little energy to pump the air.

Thirdly, it is efficient and effective since the water-guiding discs 33 allow the pressurized air to sweep the membrane bags 31 including the central portions of the membrane bags 31.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A quickly cleanable water processor comprising:
   a shell comprising a space therein, a water inlet in communication with the space, a water outlet in communication with the space and an air inlet in communication with the space;
   a water pipe including a portion horizontally disposed in the shell, another portion connected to a motor placed outside the shell so that the water pipe is rotated by the motor, and slots defined therein;
   at least one filtering unit detachably provided around the water pipe so that the filtering unit is rotated by the water pipe, wherein the filtering unit comprises:
      membrane bags each comprising a central aperture in communication with a respective one of the slots of the water pipe; and
      water-guiding discs alternately arranged with the membrane bags in a waterproof manner; and
   a cleaning unit comprising an air pump and an air pipe extended into the shell from the air pump through the air inlet, wherein the air pipe horizontally extends below the filtering unit, and comprises apertures through which air reaches the membrane bags from the air pipe.

2. The water processor according to claim 1, wherein the shell comprises an air outlet through which the air leaves the shell.

3. The water processor according to claim 1, wherein the shell comprises a cylinder and two covers for closing the cylinder.

4. The water processor according to claim 1 comprising two guiding discs provided around the water pipe and formed with bosses in contact with the shell, wherein the filtering unit is sandwiched between the guiding discs.

5. The water processor according to claim 1, wherein the water pipe comprises two sections and a tubular joint between the sections.

6. The water processor according to claim 1, wherein the membrane bags extend perpendicular to the water pipe.

* * * * *